United States Patent
Ye (10) Patent No.: US 10,773,649 B2
(45) Date of Patent: Sep. 15, 2020

(54) AUTOMOBILE ELECTRIC PEDAL

(71) Applicant: Anhui Aggeus Auto-tech Co., Ltd., Wuhu, Anhui (CN)

(72) Inventor: Jinsong Ye, Anhui (CN)

(73) Assignee: Anhui Aggeus Auto-tech Co., Ltd., Anhui (CN)

( * ) Notice: Subject to any disclaimer, the term of this patent is extended or adjusted under 35 U.S.C. 154(b) by 0 days.

(21) Appl. No.: 16/669,670

(22) Filed: Oct. 31, 2019

(65) Prior Publication Data
US 2020/0139892 A1 May 7, 2020

(30) Foreign Application Priority Data
Nov. 1, 2018 (CN) .......................... 2018 1 1293017

(51) Int. Cl.
*B60R 3/02* (2006.01)
*B60R 3/00* (2006.01)

(52) U.S. Cl.
CPC ................ *B60R 3/02* (2013.01); *B60R 3/002* (2013.01)

(58) Field of Classification Search
CPC .................................. B60R 3/02; B60R 3/002
See application file for complete search history.

(56) References Cited

U.S. PATENT DOCUMENTS

| 6,834,875 | B2 * | 12/2004 | Leitner | ..................... | B60R 3/02 |
| | | | | | 280/166 |
| 2015/0123374 | A1 * | 5/2015 | Smith | ...................... | B60R 3/02 |
| | | | | | 280/166 |

FOREIGN PATENT DOCUMENTS

CN          104385989 A          3/2015

* cited by examiner

*Primary Examiner* — Bryan A Evans
(74) *Attorney, Agent, or Firm* — Budzyn IP Law, LLC (57) ABSTRACT

The invention discloses an automobile electric pedal which includes a driving support bracket, a driven support bracket and a pedal mounted on the driving support bracket and the driven support bracket. The driving support bracket includes a rotation mechanism having a lower support wall and an upper support wall, the angle b between the lower support wall and a horizontal plane being in the range of 10-30°. The rotation mechanism is provided with a connection column fixedly matched with the automobile pedal. Matching walls of a connection groove provided with the rotation mechanism cooperate with the connection column to stably fix the pedal on the driving support bracket.

11 Claims, 5 Drawing Sheets

AUTOMOBILE ELECTRIC PEDAL

TECHNICAL FIELD

The invention belongs to the technical field of automobile pedals, and relates in particular to an automobile electric pedal.

BACKGROUND OF THE PRESENT INVENTION

An automobile electric pedal is a kind of automatically retractable automobile foot pedal. When a door of an automobile is opened, an electric foot pedal extends automatically until the foot pedal reaches a limit position. When the door is closed, the electric foot pedal retracts automatically and the foot pedal retracts to the bottom of the car. This gives a sense of etiquette and welcome to automobile users. As such, the electric pedal provides convenience for getting on and off high chassis cars and practical and comfortable functions in particular for women, children and elderly. Compared with fixed pedals, electric pedals do not reduce versatility of automobiles. However, existing automobile electric pedals move downward when contracting, which may to encounter obstacles below the chassis in the process of contracting, causing potential safety hazards.

An automobile electric telescopic pedal with dual-station support function is provided in Chinese patent application number 201410652967.8 (publication date 17 Nov. 2014). The automobile electric telescopic pedal comprises a pedal body, a first pedal mounting bracket assembly and a forward and reverse rotation motor. The first pedal mounting bracket assembly comprises a first motor mounting frame, a first main driving plate, a first auxiliary connecting plate and a first telescopic bracket, the outer end of the first telescopic bracket is fixedly connected with the pedal body in a support fit way, and the upper ends and the lower ends of the first main driving plate and the first auxiliary connecting plate are respectively hinged and fit with the inner ends of the first motor mounting frame and the first telescopic bracket to form a planar four-bar linkage. When the first telescopic bracket is controlled in an extension state, a limiting protrusion block of the first main driving plate abuts a limiting protrusion block of the first auxiliary connecting plate; when the first telescopic bracket is controlled in a retraction state, an outer contour surface of the first main driving plate is provided with an outer protrusion part which abuts an upper end surface of the first telescopic bracket. Disadvantages of the automobile electric telescopic pedal are that its stability is poor, support of the bracket to the pedal is not firm enough, and it moves downward when retracting and may hit obstacles beneath the chassis, causing potential safety hazards.

SUMMARY OF THE PRESENT INVENTION

Technical Problems to be Solved by the Invention

The purpose of the invention is to solve the problems associated with existing automobile electric pedals of poor stability and high risk of hitting obstacles beneath the automobile chassis while retracting and to provide an automobile electric pedal, which has higher stability and can avoid hitting obstacles beneath the chassis in the process of retraction.

Technical Solutions

To achieve the above purpose, the technical solution provided by the invention is as follows:

An automobile electric pedal of the invention, the driving support bracket includes automobile connection rod I, a driving motor, automobile connection rod II, a gearbox and a rotation mechanism. The automobile connection rod I and automobile connection rod II are respectively fixed with the automobile installed thereon, the automobile connection rod I and automobile connection rod II are fixedly connected with the gearbox respectively, and the gearbox is connected with the driving motor. The driving motor is fixed on the gearbox, and the rotation mechanism is connected with the gearbox through the rotation column. The rotation column is arranged below the automobile connection rod II, and the rotation mechanism is connected with the automobile pedal. The rotation mechanism includes a lower support wall and an upper support wall, the upper support wall is horizontally arranged, and the angle b between the lower support wall and a horizontal plane is 10 to 30 degrees. The rotation mechanism is provided with a connection groove at one end way from the rotation column, and the connection groove is provided with a connection column fixedly matched with the automobile pedal, with two sides of the connection groove being provided with a horizontal and flush matching wall II and a matching wall III. The matching wall II and the matching wall III are lower than the upper support wall, a vertical matching wall I is arranged between the upper support wall and the matching wall II, one end of the rotation column far away from the rotation mechanism is connected with the gearbox through a driving shaft, the lower end of the rotation column is provided with a rotation column support arm, the rotation column support arm is arranged in parallel with the rotation column, the front end of the rotation column support arm is provided with a fixing arm which is perpendicular to the rotation column, and one side of the rotation column support arm protrudes upward and is connected with the rotation column through a fixing pin.

Preferably, the driven support bracket includes a driven automobile connection rod II and a driven rotation mechanism, one end of the driven automobile connecting column II is fixed with the installed automobile, the other end is fixedly connected with the driven connecting member, the driven rotation mechanism is connected with the driven connecting member through the driven rotation column, the driven rotation column is arranged below the driven automobile connection rod II, and the driven rotation mechanism is connected with the automobile pedal. The driven rotation mechanism includes the driven lower support wall and the driven upper support wall. The driven upper support wall is horizontally arranged, the included angle b between the driven lower support wall and the horizontal plane is 10-30°, the end of the driven rotation mechanism far away from the driven rotation column is provided with the driven connection groove, and the driven connection groove is provided with a driven connection column cooperatively fixed with the automobile pedal. The driven connection column is vertically arranged at the bottom of the driven connection groove. The two sides of the driven connection groove are provided with horizontal and flush driven matching wall II and driven matching wall III. The driven matching wall II and driven matching wall III are lower than the driven upper support wall. The vertical driven matching wall I is arranged between the driven upper support wall and driven matching wall II. The end of the driven rotation column far away from the driven rotation mechanism is connected with the driven connecting member through the driven shaft. The lower end of the driven rotation column is provided with a driven rotation column support arm, the driven rotation column support arm is arranged in parallel with the driven rotation column. The front end of the driven rotation column support arm is provided with a driven fixing arm perpendicular to the driven rotation column, and one side of the driven rotation column support arm protrudes upward and is fixedly connected with the driven rotation column through the driven fixing pin.

Preferably, one end of the rotation mechanism close to the rotation column is provided with an upper connection wall and a lower connection wall; the upper connection wall and the lower connection wall are arranged in parallel, and the upper connection wall and the lower connection wall form a rotation column groove; the rotation column groove is provided with a rotation column shaft, and the rotation column shaft is connected with the rotation column; one end of the driven rotation mechanism close to the driven rotation column is provided with the driven upper connection wall and the driven lower connection wall; the driven upper connection wall and the driven lower connection wall are arranged in parallel, the driven upper connection wall and the driven lower connection wall form a driven rotation column groove, in the driven rotation column groove is provided with a driven rotation column rotating shaft, and the driven rotation column rotating shaft is connected with the driven rotation column.

Preferably, the rotation column is set to tile down, and the rotation column is set at an angle of 10-30° to the horizontal plane; the driven rotation column is set to tile down, and the driven rotation column is set at an angle of 10-30° to the horizontal plane.

Preferably, one end of the rotation mechanism far away from the rotation column is provided with a connection groove, the connection groove is provided with a connection column which is cooperatively fixed with the automobile pedal, the connection column is vertically arranged at the bottom of the connection groove, the end of the driven rotation mechanism far away from the driven rotation column is provided with a driven connection groove, and the driven connection groove is provided with a driven connection column which is cooperatively fixed with the automobile pedal. The driven connection column is vertically arranged at the bottom of the driven connection groove.

Preferably, the automobile connection rod II is fixedly connected with the gearbox through a fixing column, and the fixing column is set to be at least two and to be parallel to each other; the driven automobile connection rod II and the driven connecting member are fixedly connected through the driven fixing column, and the driven fixing column is set to be at least two and to be parallel to each other.

Preferably, the rotation column is connected with the gearbox through a driving shaft; the driving shaft is connected with the gearbox; the end of the driving shaft far away from the gearbox is provided with a limiting block and a rotation column support arm; the limiting block is arranged at the end of the rotation column support arm far away from the gearbox; the driven rotation column is connected with the driven connecting member through a driven shaft, and the driven shaft is connected with the driven connecting member; one end of the driven shaft far away from the driven connecting member is provided with a driven limiting block and a driven rotation column support arm, and the driven limiting block is arranged at the end of the driven rotation column support arm far away from the driven connecting member.

Preferably, a fixing plate is arranged between the automobile connection rod II and the fixing column, the fixing plate and the fixing column are vertically arranged, the included angle a between the automobile connection rod II and the fixing plate is 90-110°; a driven fixing plate is arranged between the driven automobile connection rod II and the driven fixing column, the driven fixing plate and the driven fixing column are vertically arranged, and the included angle a between the driven automobile connection rod II and the driven fixing plate is 90-110°.

Preferably, the rotation column support arm is fixedly connected with one end of the rotation column far away from the automobile connection rod II, the rotation column support arm and the rotation column rotate synchronously with the driving shaft as the rotating shaft; the driven rotation column support arm is fixedly connected with one end of the driven rotation column far away from the driven automobile connection rod II, and the driven rotation column support arm is fixedly connected with the driven rotation column with the driven shaft as the rotating shaft for synchronous rotation.

Preferably, the automobile connection rod I and the automobile connection rod II are vertically arranged; the automobile connection rod I is provided with a connection rod I fixing hole, the automobile connection rod II is provided with a connection rod II fixing hole; the driven automobile connection rod II is provided with a driven connection rod II fixing hole.

Advantages

Compared with existing products, the technical solution provided by the invention has the following advantages:

The automobile electric pedal in the present invention comprises a driving support bracket, a driven support bracket and a pedal. The pedal is mounted on the driving support bracket and the driven support bracket. The driving support bracket comprises a first automobile connection column, a driving motor, a second automobile connection column, a gear box and a rotation mechanism. The rotation mechanism comprises a lower support wall and an upper support wall, the angle b between the lower support wall and a horizontal plane is 10 to 30 degrees, the inclined lower support wall can improve stability of the rotation mechanism, the rotation mechanism is provided with a connection groove at one end far away from the rotation column, and the connection groove is provided with a connection column fixedly matched with the automobile pedal, with two sides of the connection groove provided with a horizontal and flush second matching wall and a third matching wall. The second matching wall and the third matching wall are lower than the upper support wall, a vertical first matching wall is arranged between the upper support wall and the second matching wall, and the horizontal and flush second matching wall and the third matching wall cooperate with the connection column to stably fix the pedal on the driving support bracket. Through the additional support of the rotation column by the rotation column support arm, the rotation column is more firmly supported, and the durability of use is improved. Arranging the fixing arm perpendicular to the rotating rod ensures that forces applied on the rotation column are perpendicular to the rotation column support arm. Consequently, the supporting effect is better. At the same time, the driving motor drives the rotating rod to rotate in the horizontal direction, by which the rotation mechanism can rotate in an approximately horizontal direction, which can effectively prevent the automobile pedal from hitting obstacles beneath the chassis in the process of retraction, which may cause potential safety problems.

NUMERALS IN THE ACCOMPANYING DRAWINGS

100—driving support; 110—automobile connection rod I; 111—fixing hole for connection rod I;
120—driving motor;
130—automobile connection rod II; 131—fixing hole connection rod II; 132—fixing columns; 133—fixing plate;
140—gearbox; 141—rotation column; 142—driving shaft; 143—rotation column support arm; 144—limiting block; 145—fixing arm; 146—fixing pin;
150—rotation mechanism; 151—rotation column groove; 152—lower connection wall; 153—upper connection wall; 154—rotation column shaft; 155—connection groove; 156—connection column; 157—lower support wall; 158—upper support wall; 1591—matching wall I; 1592—matching wall II; 1593—matching wall III;
200—driven support bracket;
230—driven automobile connection rod II; 231—fixing hole for driven connection rod II; 232—driven fixing column; 233—driven fixing plate;
240—driven connecting member; 241—driven rotation column; 242—driven shaft; 243—driven rotation column support arm; 244—driven limiting block; 245—driven fixing arm; 246—driven fixing pin;
250—driven rotation mechanism; 251—driven rotation column groove; 252—driven lower connection wall; 253—driven upper connection wall; 254—driven rotation column shaft; 255—driven connection groove; 256—driven connection column; 257—driven lower support wall; 258—driven upper support wall; 2591—driven matching wall I; 2592—driven matching wall II, 2593—driven matching wall III;
300—pedal.

DETAILED DESCRIPTION OF THE PRESENT INVENTION

In order to facilitate understanding of the invention, a more comprehensive description of the invention is provided with reference to the accompanying drawings, and which several embodiments of the invention are given. However, the invention can be realized in many different forms, and is not limited to the embodiments described herein. The purpose of providing these embodiments is merely to illustrate the invention in a more thorough and comprehensive manner.

It should be noted that when a component is described as "fixed" to or "fixedly arranged" to another component, it may be directly arranged on the other component or via an intermediate component, and this encompasses scenarios where the component is detachably fixed or fixedly arranged to the other component. Similarly, when a component is described as "connected" to another component, it may be directly connected to the other component or via an intermediate component. Terms "vertical", "horizontal", "left", "right" and similar expressions used herein are for illustration purposes only and are not intended to mean exactly vertical or horizontal, or exactly to left or to the right.

Unless otherwise defined, all technical and scientific terms used herein have the same meanings as those generally understood by those skilled in the art. Terms used herein in the specification of the invention are only for the purpose of describing specific embodiments, and are not intended to limit the invention; the term "and/or" used herein includes any and all combinations of one or more related listed items.

Embodiments

Referring to FIGS. 1-7, an electric pedal for an automobile according to an embodiment of the invention includes a driving support bracket 100, a driven support bracket 200 and a pedal 300, and the pedal 300 is installed on the driving support bracket 100 and the driven support bracket 200. In an alternative embodiment, two driven support brackets 200 (not shown in the drawings) are provided at one end or both ends of the driving support bracket 100. This allows for a more balanced electric pedal structure, especially for automobiles with extended length.

Figure 1:
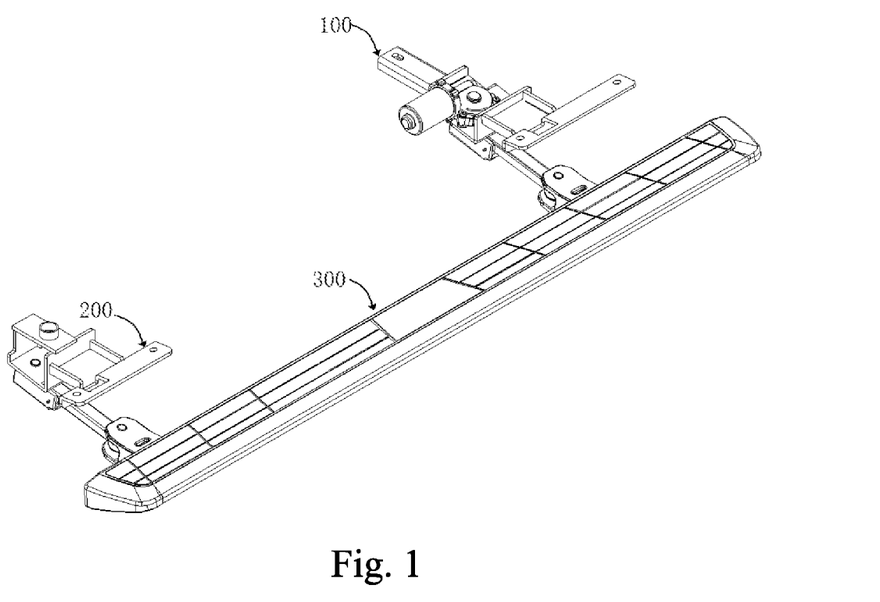
FIG. 1 is a structural schematic diagram of the automobile electric pedal.
Figure 2:
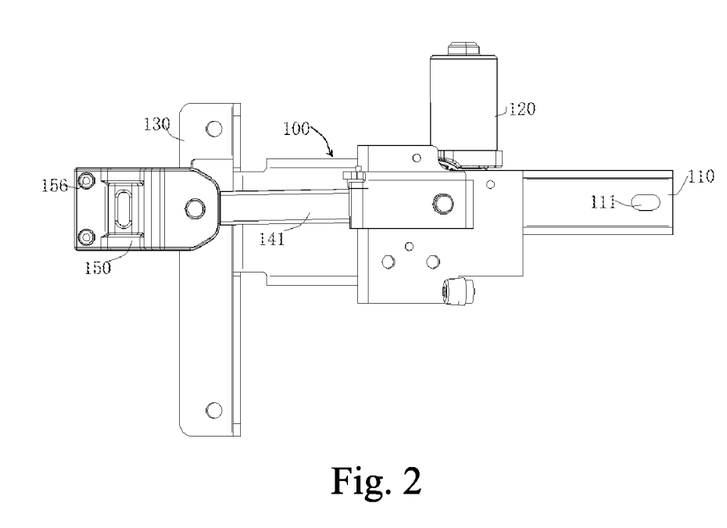
FIG. 2 is a structural schematic diagram I of the driving pedal of the automobile electric pedal of the invention.
Figure 3:
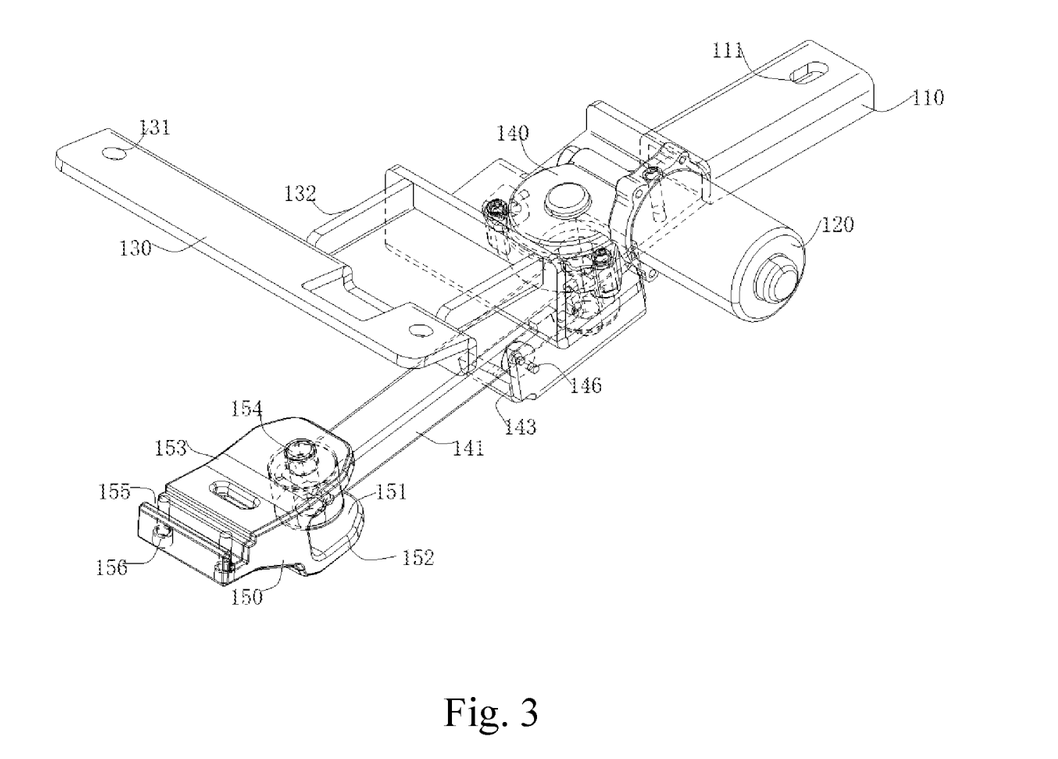
FIG. 3 is a structural schematic diagram II of the driving pedal structure of the automobile electric pedal of the invention.
Figure 4:
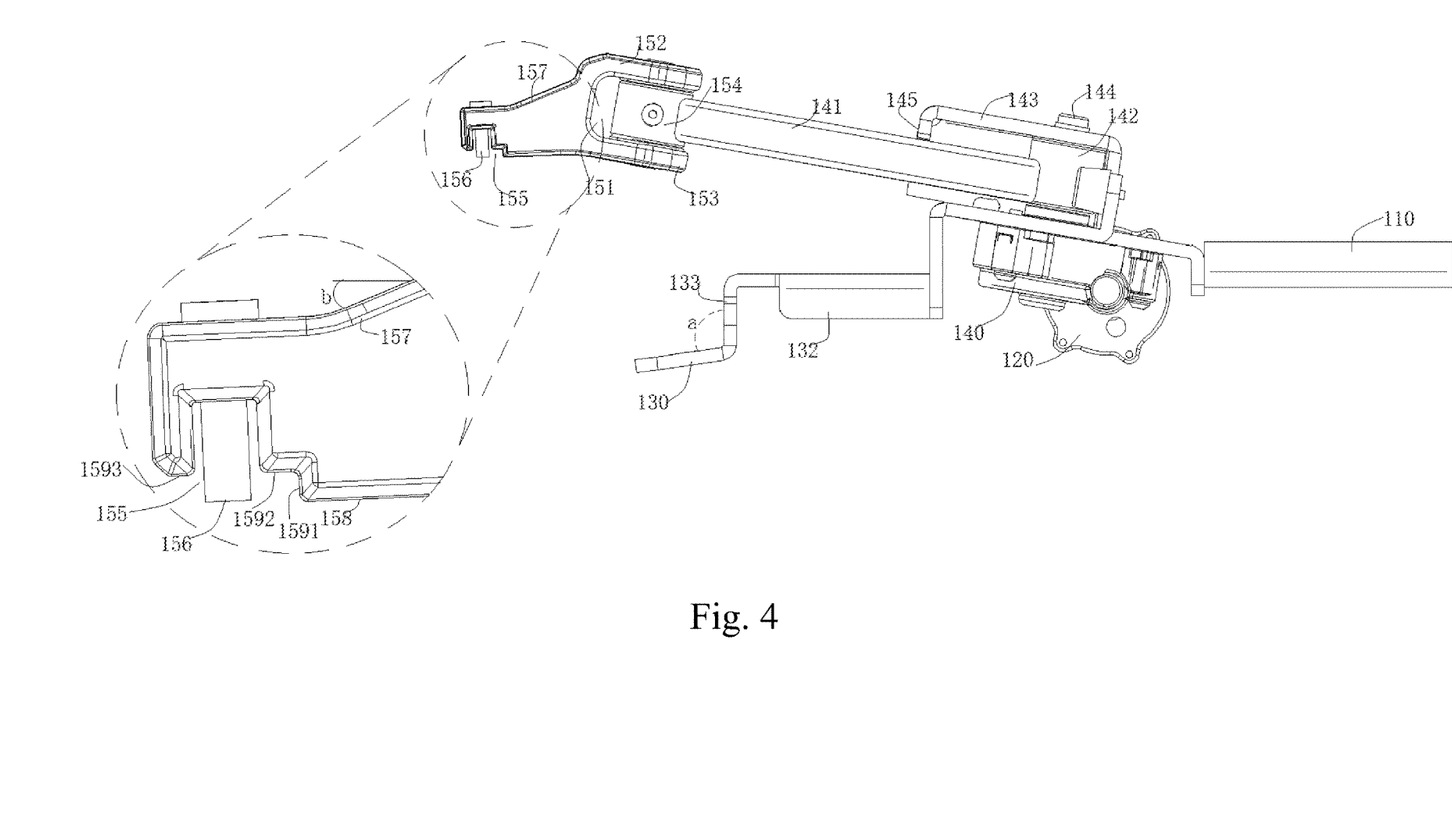
FIG. 4 is a structural schematic diagram III of the driving pedal structure of the automobile electric pedal of the invention.

The driving support 100 includes an automobile connection rod I 110, a driving motor 120, an automobile connection rod II 130, a gearbox 140 and a rotation mechanism 150. The automobile connection rod I 110 and the automobile connection rod II 130 are respectively fixed to the automobile to which the electric pedal is installed; the automobile connection rod I 110 and the automobile connection rod II 130 are respectively fixed with the gearbox 140, the gearbox 140 is connected with the driving motor 120 which is fixed on the gearbox 140; the rotation mechanism 150 is connected with the gearbox 140 through a rotation column 141, the rotation column 141 is arranged below the automobile connection rod II 130, and the rotation mechanism 150 is connected with the automobile pedal; the rotation mechanism 150 includes a lower support wall 157 and an upper support wall 158, the upper support wall 158 is horizontally arranged; an angle b formed between the lower support wall 157 and the horizontal plane is 10-30°, and an angle formed between the rotation column 141 and the horizontal plane is 10-30°; angle b is the same as the angle between the rotation column 141 and the horizontal plane, which offers better support for the electric pedal. A distal end of the rotation mechanism 150 away from the rotation column 141 is provided with a connection groove 155. The connection groove 155 is provided with a connection column 156 coupled with the electric pedal. The connection column 156 is vertically arranged at the bottom of the connection groove 155, and both sides of the connection groove 155 are provided with a horizontal and flush fit. A matching wall 1592 and a matching wall 1593 are lower than the upper support wall 158, and a vertical matching wall 1591 is arranged between the upper support wall 158 and the matching wall 1592. The matching wall 2 and the matching wall 3 are matched with the connection column to stably fix the electric pedal on the driving support. A distal end of the rotation column 141 away from the rotation mechanism 150 is connected with the gearbox 140 via a driving shaft 142. A lower end of the rotation column 141 is provided with a rotation column support arm 143 arranged in parallel with the rotation column 141. The front end of the rotation column support arm 143 is provided with a fixing arm 145 which is perpendicular to the rotation column 141. One side of the rotation column support arm 143 protrudes upward and is fixedly connected with the rotation column 141 through a fixing pin 146. Additional support for the rotation column 141 is provided by the rotation column support arm 143, which makes the support for the rotation column 141 more stable and improves the product life. Because of the fixing arm 145, which is perpendicular to the rotation column 141, forces applied on the rotation column 141 are perpendicular to the rotation column support arm 143. This improves effect of support. Also, the driving motor drives the rotation column 141 to rotate in a horizontal plane so that the rotation mechanism 150 rotates in an approximately horizontal plane. This effectively avoids risks of the automobile pedal hitting obstacles beneath the automobile chassis in the process of retraction which may cause potential safety hazards.

In an embodiment, a proximal end of the rotation mechanism 150 to the rotation column 141 is provided with an upper connection wall 153 and a lower connection wall 152. The upper connection wall 153 and the lower connection wall 152 are arranged in parallel and form a rotation column groove 151. A rotation column rotating shaft 154 is provided in the rotation column groove 151 and connected with the rotation column 141.

In an embodiment, the rotation column 141 is set to decline downward, and an angle formed between the rotation column 141 and the horizontal plane is 10-30°. The angle is greater than 10°, such that the rotation mechanism 150 is located below the automobile when the rotation column 141 rotates and retracts the rotation mechanism 150, so as to avoid the rotation mechanism 150 hitting the automobile chassis. The angle is less than 30°, so as to prevent the rotation mechanism 150 from being too close to the ground when the rotation column 141 rotates and retracts the rotation mechanism 150 and to prevent the rotation mechanism 150 from hitting obstacles on the road.

In an embodiment, a distal end of the rotation mechanism 150 away from the rotation column 141 is provided with a connection groove 155. In the connection groove 155, there is provided a connection column 156 which is vertically arranged at the bottom of the connection groove 155 and coupled with the electric pedal. The automobile connection rod II 130 and the gearbox 140 are fixedly connected via fixing columns 132. Two or more fixing columns 132 are provided, which are parallel to each other. The two or more fixing columns 132 can evenly share forces received, thus improve stability and robustness of the electric petal.

In an embodiment, the rotation column 141 is connected with the gearbox 140 via the driving shaft 142; the driving shaft 142 is connected with the gearbox 140; a distal end of the driving shaft 142 away from the gearbox 140 is provided with a limiting block 144 and a rotation column support arm 143; the limiting block 144 is arranged at a distal end of the rotation column support arm 143 away from the gearbox 140.

In an embodiment, a fixing plate 133 is provided between the automobile connection rod II 130 and the fixing columns 132. The fixing plate 133 and the fixing columns 132 are vertically arranged. An angle formed between the automobile connection rod II 130 and the fixing plate 133 is 90-110°, which extends applicability of the automobile connection rod II 130 when it is installed on an automobile and provides error tolerance during installation. The rotation column support arm 143 is fixedly connected with a distal end of the rotation column 141 away from the automobile connection rod II 130. The rotation column support arm 143 and the rotation column 141 rotate synchronously with respect to the driving shaft 142 as a rotating axis.

In an embodiment, the automobile connection rod I 110 and the automobile connection rod II 130 are vertically arranged, the automobile connection rod I 110 is provided with a fixing hole 111 for the connection rod I, and the automobile connection rod II 130 is provided with a fixing hole 131 for the connection rod II. The vertical arrangement of the automobile connection rod I and the automobile connection rod II strengthens the mounting of the driving support bracket on the automobile and improves robustness.

Figure 5:
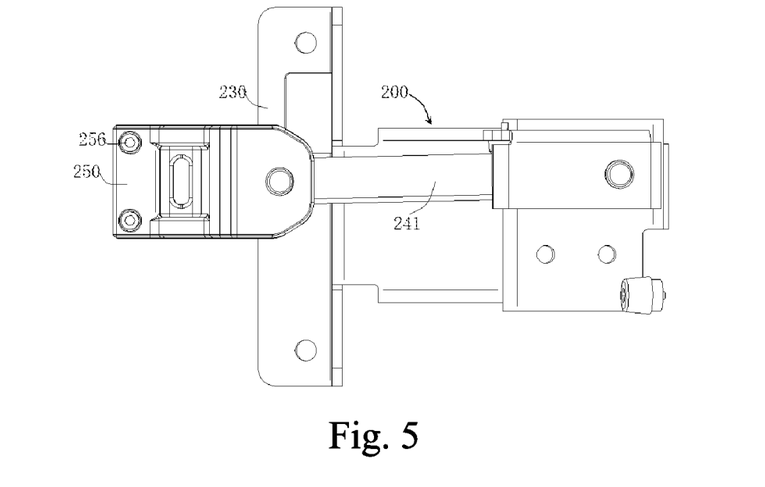
FIG. 5 is a structural schematic diagram I of the driven pedal of the automobile electric pedal.
Figure 6:
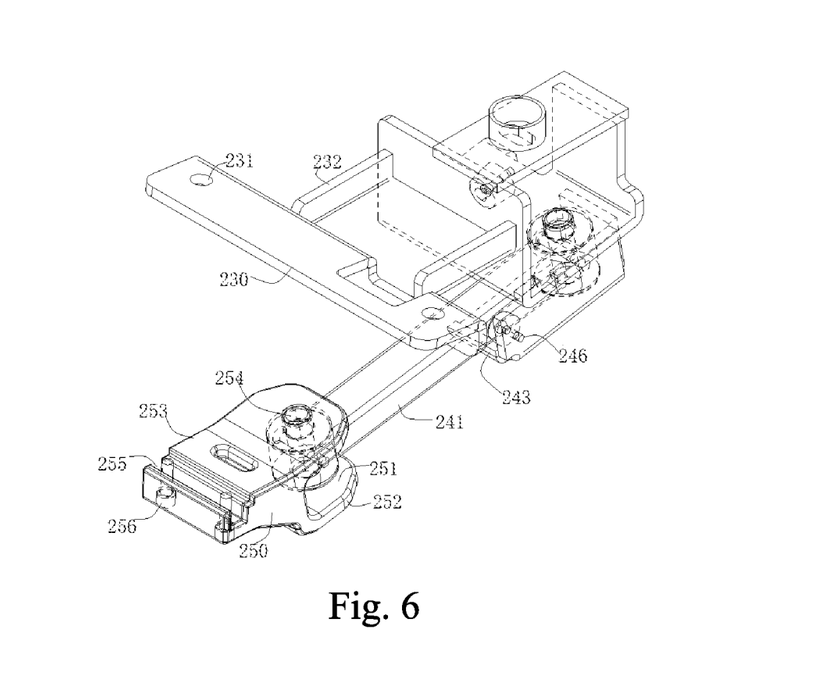
FIG. 6 is a structural schematic diagram II of the driven pedal of the automobile electric pedal of the invention.
Figure 7:
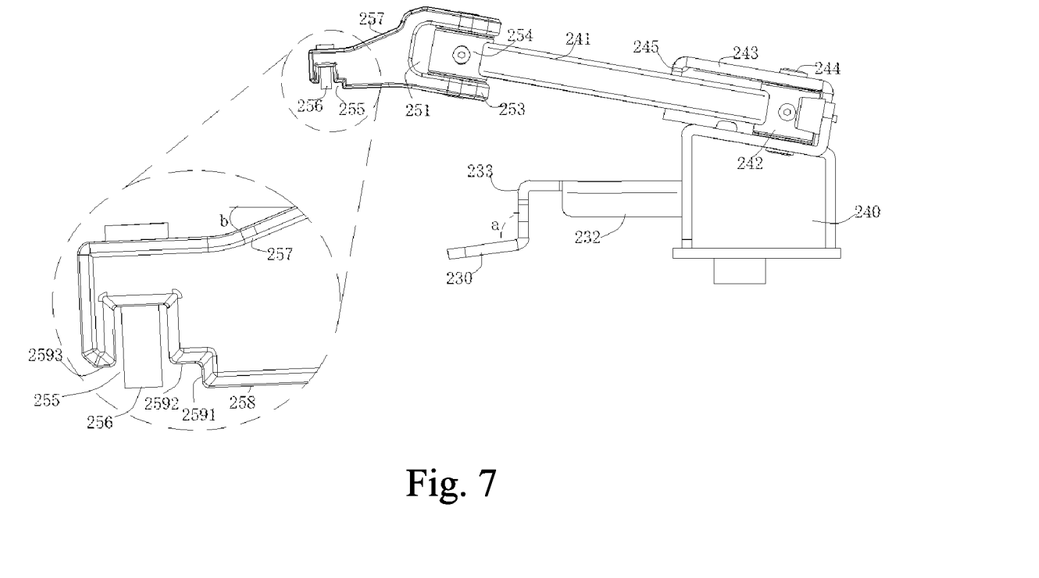
FIG. 7 is a structural schematic diagram III of the driven pedal of the automobile electric pedal.

The driven support 200 includes a driven automobile connection rod II 230 and a driven rotation mechanism 250. One end of the driven automobile connection rod II 230 is fixed with the automobile on which the electric petal is installed, and the other end is fixedly connected with a driven connecting member 240. The driven rotation mechanism 250 is connected with the driven connecting member 240 through a driven rotation column 241, and the driven rotation column 241 is arranged below the driven automobile connection rod II 230. The driven rotation mechanism 250 is connected with the electric pedal. The driven rotation mechanism 250 includes a driven lower support wall 257 and a driven upper support wall 258. The driven upper support wall 258 is horizontally arranged. An angle b formed between the driven lower support wall 257 and the horizontal plane is 10-30°, and an angle formed between the driven rotation column 241 and the horizontal plane is 10-30°. The angle b is the same as the angle between the driven rotation column 241 and the horizontal plane, so as to provide better support for the pedal. A distal end of the driven rotation mechanism 250 away from the driven rotation column 241 is provided with a driven connection groove 255. In the driven connection groove 255 there is provided a driven connection column 256 which is vertically arranged at the bottom of the driven connection groove 255 and coupled with the automobile pedal. Two sides of the driven connection groove 255 are provided with horizontal and flush driven matching wall II 2592 and driven matching wall III 2593. The driven matching wall II 2592 and the driven matching wall III 2593 are positioned lower than the driven upper support wall 258. A vertical driven matching wall I 2591 is arranged between the driven upper support wall 258 and the driven matching wall II 2592. The pedal can be stably fixed on the driven support bracket by the horizontal and flush driven matching wall II, driven matching wall III and the driven connection column. A distal end of the driven rotation column 241 away from the driven rotation mechanism 250 is connected with the driven connecting member 240 through the driven shaft 242. The lower end of the driven rotation column 241 is provided with a driven rotation column support arm 243, which is arranged in parallel with the driven rotation column 241. The front end of the driven rotation column support arm 243 is provided with a driven fixing arm 245 that is perpendicular to the driven rotation column 241. One side of the driven rotation column support arm 243 protrudes upward and fixedly connected with the driven rotation column 241 through a driven fixing pin 246. The additional support for the driven rotation column 241 by the driven rotation column support arm 243 improves stableness of support for the driven rotation column 241 and extends product life. The driven fixing arm 245, which is perpendicular to the driven rotation column 241, ensures that forces applied on the driven rotation column 241 are perpendicular to the driven rotation column support arm 243, resulting in improved support. Additionally, by rotating the driven rotation column 241 in a horizontal plane, the driven rotation mechanism 250 can rotate in an approximately horizontal plane, which can effectively avoid risks of the automobile pedal hitting obstacles beneath the automobile chassis in the process of retraction, thereby avoid potential safety hazards.

In an embodiment, a proximal end of the driven rotation mechanism 250 to the driven rotation column 241 is provided with a driven upper connection wall 253 and a driven lower connection wall 252, which are arranged in parallel. The driven upper connection wall 253 and the driven lower connection wall 252 form a driven rotation column groove 251 wherein the driven rotation column shaft 254 and the driven rotation column are arranged. The driven rotation column shaft 254 is connected with the driven rotation column 241.

In an embodiment, the driven rotation column 241 declines downwards, and an angle formed between the driven rotation column 241 and the horizontal plane is 10-30°. The angle is greater than 10°, so that the driven rotation mechanism 250 is below the automobile when the driven rotation column 241 rotates and retracts the driven rotation mechanism 250, so as to prevent the driven rotation mechanism 250 from hitting the automobile chassis. The angle is less than 30°, which can prevent the driven rotation mechanism 250 being too close to the ground when the driven rotation column 241 rotates and retracts the driven rotation mechanism 250, and prevent the driven rotation mechanism 250 from hitting obstacles on the road.

In an embodiment, a distal end of the driven rotation mechanism 250 away from the driven rotation column 241 is provided with a driven connection groove 255. A driven connection column 256 is vertically arranged at the bottom of the driven connection groove 255 and is coupled with the automobile pedal. The driven connection column 230 and the driven connection column 240 are fixedly connected via driven fixing columns 232. Two or more fixing columns 232 are provided and are parallel to each other. The two or more fixing columns can evenly share forces received, thereby improving stability and robustness of the electric pedal.

In an embodiment, the driven rotation column 241 is connected with the driven connecting member 240 via a driven shaft 242, and the driven shaft 242 is connected with the driven connecting member 240. A distal end of the driven shaft 242 away from the driven connecting member 240 is provided with a driven limiting block 244 and a driven rotation column support arm 243. The driven limiting block 244 is arranged at a distal end of the driven rotation column support arm 243 away from the driven connecting member 240.

In an embodiment, a driven fixing plate 233 is arranged between the driven automobile connection rod II 230 and the driven fixing column 232, and the driven fixing plate 233 is vertically arranged with the driven fixing column 232. An angle formed a between the driven automobile connection rod II 230 and the driven fixing plate 233 is 90-110°, which extends applicability of the driven automobile connection rod II 230 when it is installed on an automobile provides error tolerance during installation. The driven rotation column support arm 243 is fixedly connected with a distal end of the driven rotation column 241 away from the driven automobile connection column 230. The driven rotation column support arm 243 and the driven rotation column 241 rotate synchronously with respect to the driven shaft 242 as a rotating axis. A fixing hole 231 for the driven connection rod II is arranged on the driven automobile connection rod II 230.

The above described embodiments illustrate some aspects of the invention. The specific and detailed description is not to be interpreted as the limiting of the scope of the invention. It should be noted that various improvements or modifications can be made to the embodiments by those skilled in the art without departing from the scope of the invention as defined by the appended claims.

What is claimed is:

1. An electric pedal for an automobile, comprising a driving support bracket (100), wherein:
   a driving support bracket (100) includes an automobile connection rod I (110), a driving motor (120), an automobile connection rod II (130), a gearbox (140) and a rotation mechanism (150);
   the automobile connection rod I (110) and the automobile connection rod II (130) are respectively fixed with an automobile to which the electric pedal is installed;
   the automobile connection rod I (110) and the automobile connection rod II (130) are fixedly connected with the gearbox (140) respectively, and the gearbox (140) is connected with the driving motor (120) with the driving motor (120) mounted on the gearbox (140);
   the rotation mechanism (150) is connected with the gearbox (140) through a rotation column (141), the rotation column (141) arranged below the automobile connection rod II (130), and the rotation mechanism (150) is connected with the electric pedal;
   the rotation mechanism (150) includes a lower support wall (157) and an upper support wall (158), the upper support wall (158) being horizontally arranged, and the lower support wall (157) being arranged such that an angle a between the lower support wall (157) and the horizontal plane is in the region of 10-30°;
   the rotation mechanism (150) is provided with a connection groove (155) at a distal end from the rotation column (141);
   two sides of the connection groove (155) are respectively provided with a horizontal and flush matching wall II (1592) and a horizontal and flush matching wall III (1593), the matching wall II (1592) and the matching wall III (1593) positioned lower than the upper support wall (158), and a vertical matching wall I (1591) is arranged between the upper support wall (158) and the matching wall II (1592);
   a distal end of the rotation column (141) from the rotation mechanism (150) is connected with the gearbox (140) through a driving shaft (142), and a lower end of the rotation column (141) is provided with a rotation column support arm (143) arranged parallel to the rotation column (141); and
   a front end of the rotation column support arm (143) is provided with a fixing arm (145) arranged perpendicular to the rotation column (141), and a side of the rotation column support arm (143) protrudes upward and is connected with the rotation column (141) through a fixing pin (146).

2. The electric pedal according to claim 1, further comprising one or more driven support bracket (200) wherein:
   the one or more driven support bracket (200) includes a driven automobile connection rod II (230) and a driven rotation mechanism (250), one end of the driven automobile connection rod II (230) fixed with the automobile, and the other end fixedly connected with a driven connecting member (240), the driven rotation mechanism (250) connected with the electric pedal and connected with the driven connecting member (240) through a driven rotation column (241), the driven rotation column (241) arranged below the driven automobile connection rod II (230);

the driven rotation mechanism (250) includes a driven lower support wall (257) and a driven upper support wall (258), the driven upper support wall (258) being horizontally arranged, and the driven lower support wall (257) being arranged such that an angle b between the driven lower support wall and the horizontal plane is in the region of 10-30°;

a distal end of the driven rotation column (241) from the driven rotation mechanism (250) is connected with the driven connecting member (240) through a driven shaft (242), and a lower end of the driven rotation column (241) is provided with a driven rotation column support arm (243) arranged parallel to the driven rotation column (241); and a front end of the driven rotation column support arm (243) is provided with a driven fixing arm (245) arranged perpendicular to the driven rotation column (241), and a side of the driven rotation column support arm (243) protrudes upward and is fixedly connected with the driven rotation column (241) through a driven fixing pin (246).

3. The electric pedal according to claim 2, wherein:

a proximal end of the rotation mechanism (150) to the rotation column (141) is provided with an upper connection wall (153) and a lower connection wall (152) arranged in parallel and forming a rotation column groove (151);

the rotation column groove (151) is provided with a rotation column shaft (154) that is connected with the rotation column (141);

a proximal end of the driven rotation mechanism (250) to the driven rotation column (241) is provided with a driven upper connection wall (253) and a driven lower connection wall (252) arranged in parallel forming a driven rotation column groove (251); and the driven rotation column groove (251) is provided with a driven rotation column shaft (254) that is connected with the driven rotation column (241).

4. The electric pedal according to claim 2, wherein:

the rotation column (141) extends downwards and forms an angle of 10-30° with the horizontal plane; and the driven rotation column (241) extends downwards forms an angle of 10-30° with the horizontal plane.

5. The electric pedal according to claim 2, wherein:

the connection groove (155) is provided with a connection column (156) which is vertically arranged at the bottom of the connection groove (155) and fixedly coupled with the electric pedal; and a distal end of the driven rotation mechanism (250) from the driven rotation column (241) is provided with a driven connection groove (255), the driven connection groove (255) is provided with a driven connection column (256) which is vertically arranged at the bottom of the driven connection groove (255) and fixedly coupled with the electric pedal.

6. The electric pedal according to claim 2, wherein:

the automobile connection rod II (130) is fixedly connected with the gearbox (140) through fixing columns (132), the fixing columns (132) including at least two fixing columns parallel to each other;

the driven automobile connection rod II (230) and the driven connecting member (240) are fixedly connected through driven fixing columns (232), the driven fixing columns (232) including at least two fixing columns parallel to each other.

7. The electric pedal according to claim 2, wherein:

the driving shaft (142) is connected with the gearbox (140), a distal end of the driving shaft (142) from the gearbox (140) is provided with a limiting block (144) and the rotation column support arm (143), and the limiting block (144) is arranged at a distal end of the rotation column support arm (143) from the gearbox (140); and the driven shaft (242) is connected with the driven connecting member (240), a distal end of the driven shaft (242) from the driven connecting member (240) is provided with a driven limiting block (244) and the driven rotation column support arm (243), and the driven limiting block (244) is arranged at a distal end of the driven rotation column support arm (243) from the driven connecting member (240).

8. The electric pedal according to claim 2, wherein:

a fixing plate (133) is arranged between the automobile connection rod II (130) and the fixing columns (132), the fixing plate (133) and the fixing columns (132) are vertically arranged, and an angle between the automobile connection rod II (130) and the fixing plate is 90-110°; and a driven fixing plate (233) is arranged between the driven automobile connection rod II (230) and the driven fixing columns (232), the driven fixing plate (233) and the driven fixing columns (232) are vertically arranged, and an angle between the driven automobile connection rod II (230) and the driven fixing plate (233) is 90-110°.

9. The electric pedal according to claim 7, wherein:

the rotation column support arm (143) is fixedly connected with a distal end of the rotation column (141) from the automobile connection rod II (130), the rotation column support arm (143) and the rotation column (141) rotatable synchronously with respect to the driving shaft (142); and the driven rotation column support arm (243) is fixedly connected with a distal end of the driven rotation column (241) from the driven automobile connection rod II (230), the driven rotation column support arm (243) and the driven rotation column (241) rotatable synchronously with respect to the driven shaft (242).

10. The electric pedal according to claim 2, wherein:

the automobile connection rod I (110) and the automobile connection rod II (130) are vertically arranged;

the automobile connection rod I (110) is provided with a fixing hole (111) for the connection rod I, the automobile connection rod II (130) is provided with a fixing hole (131) for the automobile connection rod II; and the driven automobile connection rod II (230) is provided with a fixing hole (231) for the driven connection rod II.

11. The electric pedal according to claim 5, wherein:

two sides of the driven connection groove (255) are respectively provided with a horizontal and flush driven matching wall II (2592) and a horizontal and flush driven matching wall III (2593), the driven matching wall II (2592) and driven matching wall III (2593) positioned lower than the driven upper support wall (258), and a vertical driven matching wall I (2591) is arranged between the driven upper support wall (258) and driven matching wall II (2592).

* * * * *